United States Patent
Mandai et al.

(10) Patent No.: US 11,939,855 B2
(45) Date of Patent: Mar. 26, 2024

(54) DIVERTING AGENT, METHOD FOR TEMPORARILY FILLING FRACTURE IN WELL USING SAME, AND METHOD FOR FURTHER FORMING FRACTURE

(71) Applicant: Mitsubishi Chemical Corporation, Tokyo (JP)

(72) Inventors: Shusaku Mandai, Tokyo (JP); Yasuhiro Hirano, Tokyo (JP); Yuya Kanamori, Tokyo (JP); Kenji Furui, Tokyo (JP); Keito Ikebata, Tokyo (JP); Tomoki Onishi, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 18/137,085

(22) Filed: Apr. 20, 2023

(65) Prior Publication Data
US 2023/0258066 A1 Aug. 17, 2023

Related U.S. Application Data

(63) Continuation of application No. PCT/JP2021/039173, filed on Oct. 22, 2021.

(30) Foreign Application Priority Data

Oct. 23, 2020 (JP) ................................. 2020-177767

(51) Int. Cl.
*E21B 43/267* (2006.01)
*C09K 8/62* (2006.01)

(52) U.S. Cl.
CPC .................................. *E21B 43/267* (2013.01)

(58) Field of Classification Search
CPC ............ C09K 11/0883; C09K 11/7734; C09K 11/77347; C09K 11/77348;
(Continued)

(56) References Cited

U.S. PATENT DOCUMENTS

| 11,384,274 | B2 * | 7/2022 | Fujita | ...................... C08L 29/04 |
| 11,674,073 | B2 * | 6/2023 | Mandai | .................. C08K 5/098 |
| | | | | 166/280.2 |

(Continued)

FOREIGN PATENT DOCUMENTS

| CN | 102344788 A | 2/2012 |
| WO | 2019/131939 A1 | 7/2019 |

(Continued)

OTHER PUBLICATIONS

International Search Report Issued in International Patent Application No. PCT/JP2021/039173, dated Dec. 28, 2021, and English translation thereof.

(Continued)

*Primary Examiner* — Zakiya W Bates
(74) *Attorney, Agent, or Firm* — GREENBLUM & BERNSTEIN, P.L.C.

(57) ABSTRACT

A diverting agent and method for temporarily filling fractures. The diverting agent contains a powder-like polyvinyl alcohol-based resin (P1) and a pellet-like polyvinyl alcohol-based resin (P2), and has an adsorption coefficient kc of 0.01 or more and 1 or less.

3 Claims, 1 Drawing Sheet

(58) Field of Classification Search
CPC .......... C09K 11/7766; C09K 11/77742; C09K 11/77747; E21B 43/267; E21B 43/26
See application file for complete search history.

(56) References Cited

U.S. PATENT DOCUMENTS

2020/0317985 A1   10/2020   Fujita et al.
2021/0363411 A1   11/2021   Mandai et al.
2021/0363413 A1   11/2021   Hirano et al.

FOREIGN PATENT DOCUMENTS

WO   2020/166595 A1   8/2020
WO   2020/166598 A1   8/2020

OTHER PUBLICATIONS

Written Opinion of the International Searching Authority for International Patent Application No. PCT/JP2021/039173, dated Dec. 28, 2021, and English translation thereof.

* cited by examiner

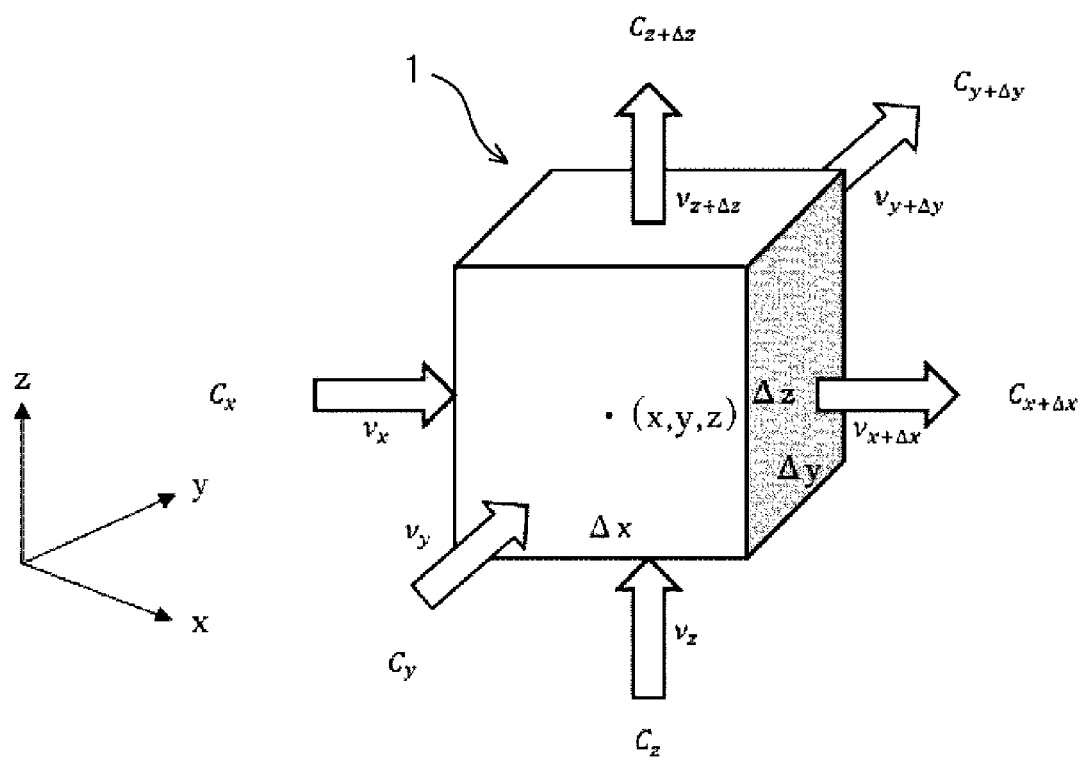

DIVERTING AGENT, METHOD FOR TEMPORARILY FILLING FRACTURE IN WELL USING SAME, AND METHOD FOR FURTHER FORMING FRACTURE

CLAIM FOR PRIORITY

This application is a Continuation of PCT/JP2021/039173 filed Oct. 22, 2021, and claims the priority benefit of Japanese application 2020-177767 filed Oct. 23, 2020, the contents of which are expressly incorporated by reference herein in their entireties.

TECHNICAL FIELD

The present invention relates to a diverting agent and a method for filling a fracture in a well using the same, and more particularly, a diverting agent used during construction of an excavation method using a hydraulic fracturing method, a method for temporarily filling a fracture in a well using the diverting agent, and a method for forming a fracture by pressurizing a fracturing fluid filled in a well while a fracture is filled.

BACKGROUND ART

The hydraulic fracturing method, in which high-pressure water is injected into an underground shale layer to generate fractures, is widely employed for extraction of oil and other underground resources. In the hydraulic fracturing method, first, a vertical hole (vertical well) is drilled vertically several thousand meters underground with a drill, and when reaching the shale layer, a horizontal hole (horizontal well) with a diameter of ten to several tens of centimeters is drilled horizontally.

Then, preliminary blasting, which is referred to as perforation, is performed in the horizontal well. Such preliminary blasting punches holes in a productive layer from the well. Thereafter, by injecting a fracturing fluid into the well, the fluid flows into these holes and a load is applied to these holes so as to generate fractures, and natural gas and petroleum (shale gas and oil) in the shale layer are recovered from such fractures.

According to such a method, the generation of fractures increases a resource inflow cross-section of the well, and thus it is possible to efficiently extract the underground resources.

In the hydraulic fracturing method, in order to make existing fractures grow larger or generate more fractures, by temporarily filling some of the existing fractures using an additive referred to as a diverting agent and pressurizing the fracturing fluid filled in the well in this state, the fluid will entry other fractures, which can cause other fractures to grow larger or generate new fractures.

The diverting agent is used to temporarily fill the fractures as described above, and uses a material that maintains the filled state for a certain period of time and then disappears when extracting natural gas, petroleum, and the like. For example, there are various techniques in which hydrolyzable resins such as polyglycolic acid and polylactic acid and water-soluble resins such as polyvinyl alcohol-based resins are used as the diverting agent.

Especially the polyvinyl alcohol-based resins, which are water-soluble resins, are highly expected as the diverting agent material since it takes less time to disappear than the hydrolyzable resins, and are easy to control a filling time and a dissolution rate by designing a degree of saponification, a degree of polymerization, modified species, and a degree of modification.

For example, in a diverting agent containing such a polyvinyl alcohol-based resin, as a method for controlling the time for filling fractures and the subsequent dissolution rate, Patent Literature 1 proposes a method in which a specific pressurized dehydration test is performed, and an integrated dehydration amount is plotted against a square root of a pressurization time, and a slope a when a regression line y=ax+b is drawn by the least squares method is set to a specific value or less, and proposes a diverting agent by such a method.

CITATION LIST

Patent Literature

Patent Literature 1: WO2020/166595A1

SUMMARY OF INVENTION

Technical Problem

Patent Document 1 further proposes a combination use of polyvinyl alcohol-based resins having various shapes and properties as a means for easily obtaining a diverting agent containing polyvinyl alcohol-based resins and having desired filling and dissolution properties. For example, Patent Document 1 presents an example in which a pellet-like polyvinyl alcohol-based resin and a powder-like polyvinyl alcohol-based resin are appropriately combined.

However, it was found that the shale layer has various characteristics and various ways of forming fractures, and in the process of designing and studying a diverting agent suitable for various fractures, in the pressurized dehydration test described in Patent Literature 1, when a wider slit is used, the effect on a fracture filling property differs depending on the combination of the powder-like polyvinyl alcohol-based resin and the pellet-like polyvinyl alcohol-based resin.

That is, an object of the present invention is to provide a method for designing a diverting agent and a diverting agent that can provide an excellent temporary filling property regardless of size or structure of fractures.

Solution to Problem

The present inventors diligently studied a diverting agent containing a powder-like polyvinyl alcohol-based resin and a pellet-like polyvinyl alcohol-based resin. Then, the present inventors found that, with respect to a regression line y=ax+b obtained by the least squares method from a plot of an integrated dehydration amount against a square root of a pressurization time in a pressurized dehydration test under specific conditions, by introducing an adsorption term assuming adsorption of powder into an advection equation derived from numerical simulation of a fracture filling phenomenon caused by pellets and powder, and adjusting an adsorption coefficient kc in this term, a diverting agent having an adsorption coefficient kc value within a specific numerical range when the regression line and the advection equation are matched has an excellent filling property, and is particularly capable of coping with fractures under various conditions, and then completed the present invention.

The fracture filling phenomenon caused by the powder-like polyvinyl alcohol-based resin and the pellet-like polyvinyl alcohol-based resin is presumed to proceed in two steps, which are a step of bridging to the fractures by the pellet-like polyvinyl alcohol-based resin, and a step of formation of pores accompanying the bridging and plugging by adsorption of the powder-like polyvinyl alcohol-based resin into such pores.

When numerically simulating such a filling phenomenon, it is usually sufficient to consider inflow, outflow, and accumulation of a powder dispersion into the pores. However, in a diverting agent using a polyvinyl alcohol-based resin, when the polyvinyl alcohol-based resin comes into contact with water, which is a dispersion medium, a surface thereof slightly dissolves or the polyvinyl alcohol-based resin absorbs water and swells, and as a result, an adhesive force is generated on the surface, which is considered to be a driving force for powder adsorption to the pores.

Therefore, the equation obtained by introducing the adsorption term assuming the adsorption of the powder-like polyvinyl alcohol-based resin into the advection equation that numerically simulates the fracture filling phenomenon caused by the pellet-like polyvinyl alcohol-based resin and the powder-like polyvinyl alcohol-based resin is used, and it was found that, the larger a degree of divergence between the equation and an equation obtained by an actual pressurized dehydration test, that is, the larger the adsorption coefficient value, which is obtained by adjusting the adsorption coefficient in the adsorption term, fitting the two equations, and then obtaining the adsorption coefficient when the two equations match, the greater a degree of adsorption of the powder-like polyvinyl alcohol-based resin, in other words, the greater a contribution to the filling phenomenon, and the better the filling property.

That is, the present invention is characterized by the following (1) to (3).

(1) A diverting agent, containing:
a powder-like polyvinyl alcohol-based resin (P1); and
a pellet-like polyvinyl alcohol-based resin (P2), in which
the diverting agent has an adsorption coefficient kc of 0.01 or more and 1 or less, and the adsorption coefficient kc is obtained by steps (i) to (iii), and
in the step (i), the diverting agent is added to a 0.6 mass % aqueous solution of guar gum to prepare a mixed solution having a diverting agent concentration of 6 mass %, and the mixed solution is dispersed at 23° C. for 30 minutes to obtain a dispersion, and the dispersion is pressurized and dehydrated at a pressure of 0.4 MPa using a pressure dehydration device equipped with a slit-shaped drainage unit, and an integrated dehydration amount y with respect to a square root x of time is calculated, and a regression line represented by Equation (A) calculated by the least squares method is obtained from a scatter diagram plotted on a graph in which a horizontal axis is the square root x of time and a vertical axis is the integrated dehydration amount y, in which $$y = ax + b, \text{ and} \quad \quad \text{Equation (A)}$$

in Equation (A), y represents the integrated dehydration amount (g), and x represents the square root of time (minutes) elapsed from a start of pressurization, and a and b represent a slope and an intercept of the regression line, respectively, and $0 < x \leq 2$, in the step (ii), filling of the slit-shaped drainage unit in the pressure dehydration device with the diverting agent is presumed to be plugging caused by adsorption and filling of the powder-like polyvinyl alcohol-based resin (P1) into pores formed by bridging to slits of the pellet-like polyvinyl alcohol-based resin (P2), and an adsorption term r represented by Equation (5) is introduced into an advection equation used for numerical simulation of the filling, in which $$r = kc(1 - \Phi_0)C, \text{ and} \quad \quad \text{Equation (5)}$$

in Equation (5), kc represents the adsorption coefficient, and $\Phi_0$ represents a porosity (%) of the pores formed by the pellet-like polyvinyl alcohol-based resin (P2), and C represents a concentration (mass %) of the powder-like polyvinyl alcohol-based resin (P1) in the dispersion, and in the step (iii), the adsorption coefficient kc is obtained so that the advection equation into which the adsorption term r is introduced matches Equation (A).

(2) A method for temporarily filling a fracture generated in a well, in which the diverting agent is flowed into the fracture to be filled along with a fluid flow in the well.

(3) A method for forming a new fracture by pressurizing a fracturing fluid in a well while a fracture is temporarily filled by the method for temporarily filling a fracture in a well.

Advantageous Effects of Invention

The diverting agent of the present invention has a sufficient filling property against fractures under various conditions in a well. Persistence of a filling time can also be achieved, and since the polyvinyl alcohol-based resin, which is a main component thereof, is water-soluble, the diverting agent dissolves in water and is easily removed after filling.

Therefore, the diverting agent of the present invention can be suitably used for the hydraulic fracturing method in drilling operations for natural gas, petroleum, and the like.

BRIEF DESCRIPTION OF DRAWINGS

FIG. 1 is a schematic diagram for explaining simulation of a filling behavior.

DESCRIPTION OF EMBODIMENTS

Although the present invention will be described in detail below, these contents merely show an example of preferred embodiments, and the present invention is not limited to these contents.

Note that in the present description, "polyvinyl alcohol" may be abbreviated as "PVA".

Moreover, in the present description, "mass" is synonymous with "weight".

A diverting agent of the present invention contains a powder-like PVA-based resin (P1) and a pellet-like PVA-based resin (P2), and has an adsorption coefficient kc of 0.01 or more and 1 or less, which is obtained by the following steps (i) to (iii).

(i) The diverting agent is added to a 0.6 mass % aqueous solution of guar gum to prepare a mixed solution having a diverting agent concentration of 6 mass %, and the mixed solution is dispersed at 23° C. for 30 minutes to obtain a dispersion, and the dispersion is pressurized and dehydrated at a pressure of 0.4 MPa using a pressure dehydration device equipped with a slit-shaped drainage unit, and an integrated dehydration amount y with respect to a square root x of time is calculated, and a regression line represented by the following Equation (A) calculated by the least squares method is obtained from a scatter diagram plotted on a graph in which a horizontal axis is the square root x of time and a vertical axis is the integrated dehydration amount y.

$$y = ax + b \tag{A}$$

(In Equation (A), y represents the integrated dehydration amount (g), and x represents the square root of time (minutes) elapsed from a start of pressurization, and a and b represent a slope and an intercept of the regression line, respectively, and $0 < x \leq 2$.)

(ii) Then, filling of the slit-shaped drainage unit in the pressure dehydration device with the diverting agent is presumed to be plugging caused by adsorption and filling of the powder-like PVA-based resin (P1) into pores formed by bridging to slits of the pellet-like PVA-based resin (P2), and an adsorption term r represented by the following Equation (5) is introduced into an advection equation used for numerical simulation of the filling.

$$r = kc(1 - \Phi_0)C \tag{5}$$

(In Equation (5), kc represents the adsorption coefficient, and $\Phi_0$ represents a porosity (%) of the pores formed by the pellet-like PVA-based resin (P2), and C represents a concentration (mass %) of the powder-like PVA-based resin (P1) in the dispersion.)

(iii) Then, the adsorption coefficient kc is obtained so that the advection equation into which the adsorption term r is introduced matches Equation (A).

That is, the diverting agent of the present invention is characterized in that:
a. at least two types of PVA-based resins, which are a powder-like PVA-based resin and a pellet-like PVA-based resin, are contained, and
b. an actual measurement result of a filling behavior is compared with a simulation that takes into account adsorption of the PVA-based resins, and
c. when adjusting the adsorption term (adsorption coefficient kc) in the simulation equation for fitting the two,
d. the obtained adsorption coefficient kc is a specific value.

Hereinafter, the PVA-based resin used in the present invention, the diverting agent containing the PVA-based resin, a method for actually measuring the filling behavior of the diverting agent, and a method for simulating the filling behavior will be sequentially described.

[PVA-Based Resin]

First, the PVA-based resin used in the present invention will be described.

The PVA-based resin used in the present invention is a resin mainly containing vinyl alcohol structural units, which is obtained by saponifying a polyvinyl ester-based resin obtained by polymerizing a vinyl ester-based monomer, and includes vinyl alcohol structural units corresponding to a degree of saponification and vinyl acetate structural units that are not saponified.

As the PVA-based resin in the present invention, in addition to an unmodified PVA-based resin, a modified PVA-based resin obtained by copolymerizing various monomers during production of the polyvinyl ester-based resin and saponifying the copolymer, various post-modified PVA-based resins in which various functional groups are introduced by post-modification into unmodified PVA-based resins, and the like can also be used. Such modification can be carried out as long as water solubility of the PVA-based resin is not lost. In some cases, the modified PVA-based resin may be further post-modified.

A degree of saponification (measured according to JIS K 6726:1994) of the PVA-based resin used in the present invention is preferably 60 mol % to 100 mol %. When the degree of saponification is too low, the water solubility tends to decrease. The degree of saponification is more preferably 90 mol % or more, and still more preferably 95 mol % or more, from the viewpoint of a filling property against gaps such as fractures. An upper limit thereof is more preferably 99.8 mol % or less, and still more preferably 99.5 mol % or less.

An average degree of polymerization of the PVA-based resin (measured according to JIS K 6726:1994) is preferably 100 to 3500. When the average degree of polymerization is too small, the resin tends to be easily dissolved and the filling property cannot be exhibited, and when the average degree of polymerization is too large, a dissolution rate tends to be slow, and it becomes difficult to dissolve after a certain period of time. The average degree of polymerization is more preferably 200 to 2,500, and particularly preferably 300 to 2,000, from the viewpoint of continuation of the filling property against fractures and the solubility after a certain period of time.

The PVA-based resin used in the present invention preferably has a 4 mass % aqueous solution viscosity of 2 mPa·s to 85 mPa·s, more preferably 2.5 mPa·s to 80 mPa·s, still more preferably 3 mPa·s to 75 mPa·s, and particularly preferably 3.5 mPa·s to 70 mPa·s. When the viscosity is too low, effects of the present application tends to be difficult to achieve, and when the viscosity is too high, after the filling is released, the dissolved PVA-based resin becomes more adhesive to fracture walls and the like, becomes difficult to remove, and may affect recovery of crude oil and the like.

Note that the 4 mass % aqueous solution viscosity of the PVA-based resin is a viscosity obtained by preparing a 4 mass % aqueous solution of the PVA-based resin and measuring according to JIS K6726:1994 at 20° C.

A melting point of the PVA-based resin is preferably 140° C. to 250° C., more preferably 150° C. to 245° C., still more preferably 160° C. to 240° C., and particularly preferably 170° C. to 230° C.

Note that the melting point is a value measured with a differential scanning calorimeter (DSC) at a heating or cooling rate of 10° C./min.

In the present invention, the PVA-based resin may be a modified PVA-based resin into which a functional group is introduced, and a water-soluble behavior of the PVA-based resin can be controlled by adjusting selection and an introduction amount of the functional group.

As such a PVA-based resin into which a functional group is introduced, for example, a PVA-based resin having a primary hydroxyl group in a side chain or an ethylene-modified PVA-based resin is preferable. Especially when a pellet-like PVA-based resin is to be obtained, a PVA-based resin having a primary hydroxyl group in a side chain is preferable from the viewpoint of excellent melt moldability.

Examples of such a PVA-based resin having a primary hydroxyl group in a side chain include a modified PVA-based resin having a 1,2-diol structural unit in a side chain, and a modified PVA-based resin having a hydroxyalkyl group structural unit in a side chain. Among these, it is preferable to use a particular modified PVA-based resin having a 1,2-diol structural unit in a side chain, which is represented by the following Formula (I) (hereinafter, it may be referred to as a "modified PVA-based resin containing 1,2-diol structural units in side chains").

Note that parts other than the 1,2-diol structural unit are a vinyl alcohol structural unit and a vinyl ester structural unit that is not saponified, as in ordinary PVA-based resins.

[Chem. 1]

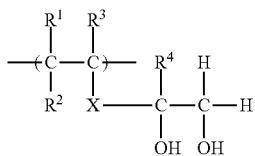

(In Formula (I), each of $R^1$ to $R^4$ independently represents a hydrogen atom or an alkyl group having 1 to 4 carbon atoms, and X represents a single bond or a bond chain.)

In the above Formula (I), each of $R^1$ to $R^4$ independently represents a hydrogen atom or an alkyl group having 1 to 4 carbon atoms. $R^1$ to $R^4$ are preferably all hydrogen atoms, but may be alkyl groups having 1 to 4 carbon atoms as long as in an amount that does not significantly impair properties of resin. Although the alkyl group is not particularly limited, for example, a methyl group, an ethyl group, an n-propyl group, an isopropyl group, an n-butyl group, an isobutyl group, and a tert-butyl group are preferable, and the alkyl group may optionally have a substituent such as a halogeno group, a hydroxyl group, an ester group, a carboxylic acid group, or a sulfonic acid group.

In the above Formula (I), X is a single bond or a bond chain, and is preferably a single bond from the viewpoint of thermal stability and stability under high temperature and acidic conditions, and may be a bond chain as long as the effects of the present invention are not inhibited.

Such a bond chain is not particularly limited, and in addition to a hydrocarbon group such as an alkylene groups, an alkenylene groups, an alkynylene group, a phenylene group, and a naphthylene group (these hydrocarbon groups may be substituted with halogen atoms such as fluorine atoms, chlorine atoms, and bromine atoms), examples thereof also include —O—, —(CH$_2$O)$_m$—, —(OCH$_2$)$_m$—, —(CH$_2$O)$_m$CH$_2$—, —CO—, —COCO—, —CO(CH$_2$)$_m$ CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi (OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl (OR)O—. Each R is independently a hydrogen atom or a random substituent, and is preferably a hydrogen atom or an alkyl group (especially an alkyl group having 1 to 4 carbon atoms). The m is a natural number, and is preferably 1 to 10, and particularly preferably 1 to 5. Among these, the bond chain is preferably an alkylene group having 6 or less carbon atoms, and particularly preferably a methylene group, or —CH$_2$OCH$_2$—, from the viewpoint of viscosity stability and heat resistance during production.

A particularly preferred structure in the 1,2-diol structural unit represented by the above Formula (I) is that $R^1$ to $R^4$ are all hydrogen atoms and X is a single bond.

When the PVA-based resin is a modified PVA-based resin, a modification rate in the modified PVA-based resin, that is, a content of structural units derived from various monomers in the copolymer or functional groups introduced by post-reaction, is preferably 0.1 mol % to 20 mol %, although it cannot be generalized since characteristics differ greatly depending on the type of functional group.

For example, when the PVA-based resin is the modified PVA-based resin containing 1,2-diol structural units in side chains, the modification rate is preferably 0.1 mol % to 20 mol %, more preferably 0.5 mol % to 10 mol %, still more preferably 1 mol % to 8 mol %, and particularly preferably 1 mol % to 3 mol %. When the modification rate is too high, a fracture in a well cannot be filled temporarily, and when the modification rate is too low, the solubility tends to deteriorate after a certain period of time.

Note that a content of the 1,2-diol structural unit in the PVA-based resin (modification rate) can be obtained from a $^1$H-NMR spectrum of a PVA-based resin with the degree of saponification of 100 mol % (solvent: DMSO-d$_6$, internal standard: tetramethylsilane). Specifically, it can be calculated from peak areas derived from hydroxyl group protons, methine protons and methylene protons in 1,2-diol structural units, methylene protons in a main chain, protons of hydroxyl groups linked to the main chain, and the like.

Note that such a modified PVA-based resin containing 1,2-diol structural units in side chains can be produced by a known production method such as a method described in JP2002-284818A, JP2004-285143A, or JP2006-95825A.

When the PVA-based resin is the ethylene-modified PVA-based resin, the modification rate is preferably 0.1 mol % to 15 mol %, more preferably 0.5 mol % to 10 mol %, still more preferably 1 mol % to 10 mol %, and particularly preferably 5 mol % to 9 mol %. When the modification rate is too high, the water solubility tends to decrease, and when the modification rate is too low, melt molding tends to be difficult.

Examples of a general method for producing the PVA-based resin used in the present invention include a method of polymerizing a vinyl ester-based monomer and saponifying the resulting polyvinyl ester polymer.

Examples of the vinyl ester-based monomer include vinyl acetate, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl pivalate, vinyl octoate, vinyl monochloroacetate, vinyl adipate, vinyl methacrylate, vinyl crotonate, vinyl sorbate, vinyl benzoate, vinyl cinnamate, and vinyl trifluoroacetate, and vinyl acetate is preferably used from the viewpoint of price and availability.

Examples of a monomer used for the copolymerization with the vinyl ester-based monomer in the production of the vinyl ester-based resin include: olefins such as ethylene, propylene, isobutylene, α-octene, α-dodecene, and α-octadecene; unsaturated acids such as acrylic acid, methacrylic acid, crotonic acid, maleic acid, maleic anhydride, and itaconic acid, salts thereof, and mono- or dialkyl esters thereof, nitriles such as acrylonitrile and methacrylonitrile; amides such as acrylamide and methacrylamide; olefinsulfonic acids such as ethylenesulfonic acid, allylsulfonic acid, and methallylsulfonic acid, or salts thereof; alkyl vinyl ethers; N-acrylamidomethyltrimethylammonium chloride; allyltrimethylammonium chloride; dimethyl allyl vinyl ketone; N-vinylpyrrolidone; vinyl chloride; vinylidene chloride; polyoxyalkylene(meth)allyl ethers such as polyoxyethylene(meth)allyl ethers and polyoxypropylene(meth)allyl ethers; polyoxyalkylene(meth)acrylates such as polyoxyethylene(meth)acrylate and polyoxypropylene(meth)acrylate; polyoxyalkylene(meth)acrylamides such as polyoxyethylene(meth)acrylamide and polyoxypropylene(meth)acrylamide; polyoxyethylene[1-(meth)acrylamide-1,1-dimethylpropyl] ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylenevinylamines such as polyoxyethylenevinylamine and polyoxypropylenevinylamine; and hydroxy group-containing α-olefins such as 3-buten-1-ol, 4-penten-1-ol, 5-hexene-1-ol, or derivatives thereof such as acylated products thereof.

Examples thereof also include compounds with diol such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane.

Polymerization of the vinyl ester-based monomer or polymerization of the vinyl ester-based monomer and a copolymerizable monomer can be carried out by any known polymerization method, such as solution polymerization, suspension polymerization, and emulsion polymerization. Among these, it is preferable to carry out solution polymerization under reflux, in which reaction heat can be removed efficiently.

Examples of a solvent used in such polymerization include aliphatic alcohols having 1 to 4 carbon atoms such as methanol, ethanol, isopropyl alcohol, n-propanol and butanol, and ketones such as acetone and methyl ethyl ketone, and it is preferable to use a lower alcohol having 1 to 3 carbon atoms.

For the saponification of the obtained polymer, a known saponification method in the related art can be adopted. That is, the saponification can be carried out using an alkali catalyst or an acid catalyst in a state in which the polymer is dissolved in an alcohol or water/alcohol solvent.

As the alkali catalyst, for example, hydroxides and alcoholates of alkali metals such as potassium hydroxide, sodium hydroxide, sodium methylate, sodium ethylate, potassium methylate, and lithium methylate can be used.

Generally, transesterification reaction using an alkali catalyst in an anhydrous alcoholic solvent is preferably used in terms of a reaction rate and an ability to reduce impurities such as fatty acid salts.

A reaction temperature for the saponification reaction is usually 20° C. to 60° C. When the reaction temperature is too low, a reaction rate tends to decrease and a reaction efficiency tends to decrease, and when the reaction temperature is too high, the temperature may become higher than a boiling point of the reaction solvent, which tends to lower safety in production. Note that when the saponification is carried out under high pressure using a tower type continuous saponification tower with high pressure resistance, the saponification can be carried out at a higher temperature, for example, 80° C. to 150° C., and it is also possible to obtain a high degree of saponification in a short period of time with a small amount of the saponification catalyst.

The PVA-based resin used in the present invention may be of one type or a mixture of two or more types. When two or more types of PVA-based resins are used, examples of the two or more types of PVA-based resins include a combination of two or more types of unmodified PVA-based resins having different degrees of saponification, average degrees of polymerization, melting points, and the like; a combination of an unmodified PVA-based resin and a modified PVA-based resin; a combination of two or more types of modified PVA-based resins having different degrees of saponification, average degrees of polymerization, melting points, types of functional groups, modification rates, and the like; a combination of a PVA-based resin produced by melt molding and a PVA-based resin obtained without melt molding; and a combination of PVA-based resins with different shapes and average particle diameters.

In the present invention, a powder-like PVA-based resin and a pellet-like PVA-based resin are used.

The powder-like PVA-based resin (P1) generally has an average particle diameter of 200 μm to 2000 μm, preferably 300 μm to 1500 μm, and more preferably 400 μm to 1000 μm.

Note that the average particle diameter can be measured by a dry sieving test method (see JIS Z 8815: 1994), and in the present description, the particle diameter is obtained by measuring volume distribution by particle diameter using the dry sieving test method and taking a particle diameter whose integrated value (cumulative distribution) is 50% as the particle diameter to be obtained.

When the average particle diameter is too large, it may take a long time to complete the filling for the fracture, and when the average particle diameter is too small, the viscosity of the dispersion may be too high, which makes it difficult to handle.

A shape of the pellet-like PVA-based resin (P2) is not particularly limited, and examples thereof include a spherical shape, an ellipsoidal shape, and pellet-like molded product (such as a cylindrical shape, a plate shape, a cube shape, a cuboid shape, a prismatic shape, and a polygonal shape).

Cylindrical and spherical pellet-like PVA-based resins, which can be easily produced by melt molding, are particularly preferably used.

A size of the pellet-like PVA-based resin may be appropriately adjusted in consideration of the size of the fracture in the well, the shape of the pellet, and the like, and when the fracture is large, a large pellet may be used, and when the fracture is small, a small pellet may be used, but those having an outer diameter in a range of 0.1 mm to 10 mm are usually used. When the size (diameter, length, average particle diameter) is too large, it tends to take a long time until filling, and when the size is too small, a plugging effect tends to decrease.

Specifically, when the pellet-like PVA-based resin is a cylindrical pellet, the average particle diameter of the pellets is preferably 0.5 mm to 5 mm, more preferably 1 mm to 4.5 mm, and still more preferably 2 mm to 4 mm in a cross section perpendicular to an axial direction. The length (length in the axial direction) thereof is preferably 0.5 mm to 7 mm, more preferably 2 mm to 6 mm, and still more preferably 3 mm to 5 mm.

When the pellet-like PVA-based resin is a spherical pellet, the average particle diameter (diameter) thereof is preferably 0.5 mm to 5 mm, more preferably 1 mm to 4.5 mm, and still more preferably 2 mm to 4 mm.

Content ratios of the powder-like PVA-based resin (P1) and the pellet-like PVA-based resin (P2) are preferably in a range of 90:10 to 20:80 in terms of P1:P2 (mass ratio), more preferably 85:15 to 30:70, and particularly preferably 80:20 to 35:65. When the content ratio of the pellet-like PVA-based resin (P2) is too low, the pellet-like PVA-based resin is not sufficiently bridged to the fracture, and pores are not formed well, and the fracture may not be sufficiently filled. Conversely, when the content ratio of the pellet-like PVA-based resin (P2) is too large, adsorption and filling of the powder-like PVA-based resin (P1) into the pores formed by the bridging of the pellet-like PVA-based resin to the fracture becomes insufficient, and the fracture may not be sufficiently filled.

Note that PVA-based resins having different shapes and sizes may be used in combination, and three or more types of PVA-based resin particles having different average particle diameters may be mixed at any ratio.

[Diverting Agent]

The diverting agent of the present invention contains the above PVA-based resin (the powder-like PVA-based resin and the pellet-like PVA-based resin). The content of the PVA-based resin is preferably 50 mass % to 100 mass %, more preferably 80 mass % to 100 mass %, and still more preferably 90 mass % to 100 mass %, based on the entire diverting agent. When the content is too small, it tends to be difficult to obtain the effects of the present invention.

Additives (additive agents) such as sand, iron, ceramics, and other biodegradable resins may be added to the diverting agent of the present invention in addition to the PVA-based resin within a range that does not inhibit the effects of the present invention.

The adding amount of such additives (additive agents) is preferably 50 mass % or less, more preferably 20 mass % or less, and still more preferably 10 mass % or less, based on the entire diverting agent.

The diverting agent can be produced by uniformly mixing the PVA-based resin of the present invention and, if necessary, other additives (additive agents).

[Filling Behavior of Diverting Agent]

As described above, the present invention is the diverting agent containing the powder-like PVA-based resin (P1) and the pellet-like PVA-based resin (P2), and exhibits a specific filling property in evaluating the fracture filling behavior by the pressure dehydration device.

<Actual Measurement of Fracture Filling Behavior>

First, a procedure for analyzing the fracture filling behavior by such a pressure dehydration device will be described.

First, the diverting agent used for the evaluation is added to a 0.6 mass % aqueous solution of guar gum to prepare a mixed solution having a diverting agent concentration of 6 mass %, and the mixed solution is dispersed at 23° C. for 30 minutes to obtain a dispersion. Then, the obtained dispersion is pressurized and dehydrated at a pressure of 0.4 MPa using the pressure dehydration device equipped with a slit-shaped drainage unit, and an integrated dehydration amount y with respect to a square root x of time is calculated, and a regression line represented by the following Equation (A) calculated by the least squares method is obtained from a scatter diagram plotted on a graph in which a horizontal axis is the square root x of time and a vertical axis is the integrated dehydration amount y.

$$y = ax + b \tag{A}$$

(In Equation (A), y represents the integrated dehydration amount (g), and x represents the square root of time (minutes) elapsed from a start of pressurization, and a and b represent a slope and an intercept of the regression line, respectively, and 0<x≤2.)

Examples of the pressure dehydration device may include "HPHT Filter Press 500CT" (trade name) manufactured by Fann Instrument Co., Ltd.

The slope a in Equation (A) represents a permeability coefficient, and the smaller the slope a, the less the dehydration amount per hour, that is, the more difficult the water flows, and the slope a is an index for a sufficient filling property and persistence thereof against the fracture in the well. The diverting agent of the present invention preferably has a slope a of 100 or less, more preferably 80 or less, and particularly preferably 50 or less. On the other hand, an lower limit thereof is not particularly limited, but is usually greater than 0.

In Equation (A), the intercept b is a variable determined by the slope a. A certain amount of dehydration occurs at the moment of pressurization, and then the diverting agent is optimally arranged to fill a slit of the pressure dehydration device. Based on the above, the dehydration amount (initial dehydration amount) at 0 minute after the pressurization starts, which is the intercept b, is not particularly limited, and is preferably 400 g or less, and more preferably 300 g or less.

<Simulation of Filling Behavior>

Next, in the present invention, the filling behavior by the adsorption and filling of the powder-like PVA-based resin into the pores formed by the bridging to the fracture by the pellet-like PVA-based resin will be described.

First, as shown in FIG. 1, a three-dimensional fine grid 1 through which the dispersion of the powder-like PVA-based resin flows in and out is considered.

Assuming that there is no external influence of concentration on the grid 1, mass balance can be expressed by Equation (1) below. Here, $m_{in}$ and $m_{out}$ in Equation (1) represent an inflow amount and an outflow amount of a fluid, respectively, and $m_a$ represents an accumulated amount.

[Eq. 1]

$$(m_{in} - m_{out}) = m_a \tag{1}$$

Equation (1) can be represented by the following Equation (2) based on FIG. 1. Here, in FIG. 1 and Equation (2), C represents a concentration of the powder-like PVA-based resin in the dispersion, and V represents a flow velocity of the dispersion, and $C_x$, $C_y$ and $C_z$ each represent a concentration in a corresponding direction, and $V_x$, $V_y$ and $V_z$ each represent a flow velocity component in a corresponding direction. $\Delta x$, $\Delta y$ and $\Delta z$ each represent an amount of change (unit volume) of each component per unit time ($\Delta t$).

[Eq. 2]

$$(C_x v_x - C_{x+\Delta x} v_{x+\Delta x}) \Delta y \Delta z \Delta t + (C_y v_y - C_{y+\Delta y} v_{y+\Delta y}) \Delta z \Delta x \Delta t + \\ (C_z v_z - C_{z+\Delta z} v_{z+\Delta z}) \Delta x \Delta y \Delta t = (C \Delta x \Delta y \Delta z)_{t+\Delta t} - \\ (C \Delta x \Delta y \Delta z)_t \tag{2}$$

In order to derive mass balance equations per unit volume and unit time, both sides of Equation (2) is divided by $\Delta x \Delta y \Delta z \Delta t$ to obtain the following Equation (3).

[Eq. 3]

$$\frac{C_x v_x - C_{x+\Delta x} v_{x+\Delta x}}{\Delta x} + \frac{C_y v_y - C_{y+\Delta y} v_{y+\Delta y}}{\Delta y} + \frac{C_z v_z - C_{z+\Delta z} v_{z+\Delta z}}{\Delta z} = \\ \frac{C_{t+\Delta t} - C_t}{\Delta t} \tag{3}$$

Here, when $\Delta x$, $\Delta y$, $\Delta z$, and $\Delta t$ are brought as close to 0 as possible, Equation (3) can be represented by Equation (4) below, which is a general advection equation.

[Eq. 4]

$$-\frac{\partial}{\partial x}(C_x v_x) - \frac{\partial}{\partial y}(C_y v_y) - \frac{\partial}{\partial z}(C_z v_z) = \frac{\partial C}{\partial t} \tag{4}$$

As described above, the filling to the fracture by the diverting agent is completed by the process of bridging, in which the pellet-like PVA-based resin accumulates in the fracture, and the process of plugging, in which the powder-like PVA-based resin is adsorbed to the pores formed by such bridging, and the pores are filled to improve the filling property. In the present invention, further attention is paid to the plugging process, and an object thereof is to formulate an adsorption ratio of the powder-like PVA-based resin to the pores. This formulation is called an adsorption term, and is assumed to be represented by the following Equation (5) in the present invention.

[Eq. 5]

$$r = kc(1-\phi_0)C \quad (5)$$

In Equation (5), r represents the adsorption ratio (adsorption term), kc represents the adsorption coefficient, $\Phi_0$ represents the porosity (%), and C represents the concentration (mass %) of the powder-like PVA-based resin in the dispersion. In other words, it is assumed that the adsorption ratio of the powder-like PVA-based resin is higher at positions where the porosity is smaller, and that the higher the concentration, the higher the adsorption ratio.

Note that the porosity $\Phi_0$ can be obtained from values obtained by filling a container with a known volume with the pellet-like PVA-based resin (P2) in the diverting agent, and then determining a volume of water required to saturate the container.

When the adsorption term is introduced into Equation (4), the following Equation (6) can be obtained, which is the advection equation in the present invention.

[Eq. 6]

$$-\frac{\partial}{\partial x}(C_x v_x) - \frac{\partial}{\partial y}(C_y v_y) - \frac{\partial}{\partial z}(C_z v_z) = \frac{\partial C}{\partial t} + r \quad (6)$$

<Fitting Between Actual Measurement Result and Simulation Result>

Next, fitting is performed between Equation (A) based on an actual measurement result of the filling behavior of the diverting agent and Advection Equation (6) used in the simulation.

Such fitting may be performed by appropriately adjusting the adsorption coefficient kc in the adsorption term r in Advection Equation (6).

When the fitting is performed between Equation (6) and Advection Equation (A), since only the process of filling is considered in this case, the fitting is performed after translating curves without considering the initial dehydration amount in Equation (A).

In the fitting, the adsorption coefficient kc in Equation (6) is appropriately changed (the porosity $\Phi_0$ adopts the value obtained by the above method), and the adsorption coefficient kc when the curve of Equation (A), which is an experimental value, and the curve of Equation (6), which is a calculated value, match each other is derived.

The diverting agent of the present invention is characterized in that the value of the adsorption coefficient kc derived by such a method is 0.01 or more and 1 or less. When the value of the adsorption coefficient kc is 0.01 or more, adhesion between the powder-like PVA-based resin and the pellet-like PVA-based resin starts, so that the fracture filling property can be improved, and when the value is 1 or less, the filling may be excessive. The adsorption coefficient kc is preferably 0.02 or more, more preferably 0.03 or more, and most preferably 0.045 or more. The adsorption coefficient kc is preferably 0.9 or less, and more preferably 0.8 or less.

Examples of a method for adjusting the adsorption coefficient kc include methods of adjusting chemical properties (degree of saponification, degree of polymerization, modified species, degree of modification, degree of heat treatment, and the like) of the PVA-based resin used, physical properties (particle diameter, size, shape, and the like) of the PVA-based resin, and combination (mixing ratio of pellets and powder, and the like) of the PVA-based resins, and the diverting agent that satisfies requirements of the present invention can be obtained by combining the above methods to adjust the adsorption coefficient.

EXAMPLES

The present invention will be described in more detail below with reference to Examples and Comparative Examples, but the present invention is not limited to these Examples. Note that in the following Examples and Comparative Examples, "parts" and "%" are based on mass unless otherwise specified.

Production Example 1: Production of Powder-Like PVA-Based Resin (PVA1)

In a reaction vessel equipped with a reflux condenser, a dropping device, and a stirrer, 20 parts (initial charge of 20% of a total) of vinyl acetate, 32.5 parts of methanol, and 0.40 parts (initial charge of 20% of a total) of 3,4-diacetoxy-1-butene were charged, and a temperature was raised under a nitrogen stream while stirring, and after reaching a boiling point, 0.093 part of acetyl peroxide was added to start polymerization. Then, 0.4 hours after the polymerization started, 80 parts of vinyl acetate and 1.60 parts of 3,4-diacetoxy-1-butene were added dropwise at a constant rate over 11 hours. When a polymerization rate of vinyl acetate reached 92%, a predetermined amount of hydroquinone monomethyl ether was added to end the polymerization, and subsequently, distillation was carried out while blowing in methanol vapor to remove unreacted vinyl acetate monomer from the system to obtain a methanol solution of the copolymer.

Next, the above solution was diluted with methanol to adjust a solid content concentration to 55%, and while maintaining the solution temperature at 45° C., saponification was performed by adding 2% sodium hydroxide solution in methanol (in terms of sodium) in a ratio of 12 millimoles per 1 mole of a total amount of vinyl acetate structural units and 3,4-diacetoxy-1-butene structural units in the copolymer. As the saponification progressed, a saponified product precipitated, and when it became cake-like, it was pulverized. Then, 0.3 equivalent of acetic acid for neutralization was added per equivalent of sodium hydroxide, filtered, washed well with methanol and dried in a hot air dryer to obtain the powder-like PVA-based resin (PVA1) containing 1,2-diol structural units in side chains.

The obtained PVA1 was powder-like and was sieved by a dry sieving test method to calculate a particle diameter at which an integrated value was 50%. The average particle diameter of PVA1 was 750 μm.

The degree of saponification of PVA1 was 99.3 mol % when analyzed by an alkali consumption amount required for hydrolysis of the residual vinyl acetate and 3,4-diacetoxy-1-butene structural units in the resin. The average degree of polymerization was 450 when analyzed according to JIS K6726:1994.

The content (modification rate) of the 1,2-diol structural units represented by Formula (I) in PVA1 was 1.0 mol % when calculated from an integrated value measured by ¹H-NMR (300 MHz proton NMR, d₆-DMSO solution, internal standard substance: tetramethylsilane, 50° C.).

Production Example 2: Production of Powder-Like PVA-Based Resin (PVA2)

The powder-like PVA-based resin (PVA2) containing 1,2-diol structural units in side chains was obtained in the same manner as in Production Example 1 except that the saponification was performed by adding 2% sodium hydroxide solution in methanol (in terms of sodium) in a ratio of 10 millimoles per 1 mole of a total amount of vinyl acetate structural units and 3,4-diacetoxy-1-butene structural units.

The obtained PVA2 was powder-like and had an average particle diameter of 750 μm, a degree of saponification of 98.9 mol %, an average degree of polymerization of 450, and a modification rate of 1.0 mol %.

Production Example 3: Production of Powder-Like PVA-Based Resin (PVA3)

The powder-like PVA-based resin (PVA3) containing 1,2-diol structural units in side chains was obtained in the same manner as in Production Example 1 except that the saponification was performed by adding 2% sodium hydroxide solution in methanol (in terms of sodium) in a ratio of 8 millimoles per 1 mole of a total amount of vinyl acetate structural units and 3,4-diacetoxy-1-butene structural units.

The obtained PVA3 was powder-like and had an average particle diameter of 750 μm, a degree of saponification of 98.5 mol %, an average degree of polymerization of 450, and a modification rate of 1.0 mol %.

Production Example 4: Production of Pellet-Like PVA-Based Resin (PVA4 to PVA7)

A modified PVA-based resin containing 1,2-diol structural units in side chains was obtained in the same manner as in Production Example 1, except that the vinyl acetate charged in Production Example 1 was changed to 100 parts, and methanol was changed to 32.5 parts, and 3,4-diacetoxy-1-butene was changed to 4 parts, and in the polymerization reaction, the polymerization was ended when the polymerization rate of the vinyl acetate reached 91%.

The resulting modified PVA-based resin containing 1,2-diol structural units in side chains had a degree of saponification of 99.0 mol %, an average degree of polymerization of 530, and a modification rate of 2.0 mol %.

The modified PVA-based resin containing 1,2-diol structural units in side chains obtained above was charged into an extruder, and further mixed with 500 ppm of magnesium stearate, 500 ppm of magnesium 12-hydroxystearate and 3000 ppm of an antioxidant ("AO-60" manufactured by ADEKA), and the mixture was melt-kneaded under the following conditions and air-cooled to solidify. Thereafter, the resin was cut with a cutter (strand cutting method) and dried to obtain the pellet-like modified PVA-based resin containing 1,2-diol structural units in side chains (PVA4 to PVA7). Note that by adjusting a die diameter during extrusion and a cut length during cutting, pellets of various sizes shown in Table 1 were obtained.

(Melt-Kneading Conditions)

Extruder: 15 mmφ, L/D=60, manufactured by TECHNOVEL CORPORATION

Rotation speed: 200 rpm

Discharge rate: 1.2 kg/h to 1.5 kg/h

Extrusion temperature: C1/C2/C3/C4/C5/C6/C7/C8/D=90/170/200/215/215/220/225/225/225° C.

Table 1 summarizes physical properties of PVA1 to PVA7 produced above.

TABLE 1

| | Appearance | Degree of saponification (mol %) | Average degree of polymerization | Modification rate (mol %) | Powder-like PVA Average particle diameter (μm) | Pellet-like PVA Diameter (mm) | Pellet-like PVA Length (mm) |
|---|---|---|---|---|---|---|---|
| PVA1 | Powder | 99.3 | 450 | 1.0 | 750 | — | — |
| PVA2 | Powder | 98.9 | 450 | 1.0 | 750 | — | — |
| PVA3 | Powder | 98.5 | 450 | 1.0 | 750 | — | — |
| PVA4 | Pellet | 99.0 | 530 | 2.0 | — | 3.4 | 3.0 |
| PVA5 | Pellet | 99.0 | 530 | 2.0 | — | 4.3 | 4.8 |
| PVA6 | Pellet | 99.0 | 530 | 2.0 | — | 4.3 | 3.0 |
| PVA7 | Pellet | 99.0 | 530 | 2.0 | — | 4.3 | 4.8 |

Examples 1 to 6, Comparative Examples 1 and 2

In the combinations shown in Table 2, 30% powder-like PVA-based resin (PVA1 to PVA3) and 70% pellet-like PVA-based resin (PVA4 to PVA7) were uniformly mixed to obtain a particle mixture.

<Pressurized Dehydration Test>

A dehydration amount of a dispersion in which the particle mixture of each example was dispersed was measured using a pressure dehydration device "HPHT Filter Press 500CT" manufactured by Fann Instrument.

The particle mixture was added to a 0.6 mass % aqueous solution of guar gum to prepare a mixed solution in which the concentration of the particle mixture was 6 mass %. This mixed solution was stirred for 30 minutes at 23° C. to obtain a dispersion.

Next, a slit of a drainage unit of the pressure dehydration device was set to have a width of 3 mm or 4 mm, and a pressure of 1 MPa was applied to pressurize and dehydrate.

The dehydration amount was measured every 0.5 minutes from the start of pressurization (0 minute) for 5 minutes, and the integrated dehydration amount y with respect to the square root of time x was obtained. A regression line represented by the following Equation (A) was calculated by the least squares method from a scatter diagram plotted on a graph with the square root of time x on a horizontal axis and the integrated dehydration amount y on a vertical axis.

$$y = ax + b \tag{A}$$

(In Equation (A), y represents the integrated dehydration amount (g), and x represents the square root of time (minutes) elapsed from a start of pressurization, and a and b represent a slope and an intercept of the regression line, respectively, and $0<x\leq2$.)

From the obtained straight line, the slope a of Equation (A) was determined as the permeability coefficient, and the dehydration amount at 0 minute from the start of pressurization, which is the intercept b, was determined as the initial dehydration amount.

<Fitting with Advection Equation>

Fitting was performed between Advection Equation (6) used in the present invention and the above Equation (A). The adsorption coefficient kc in the adsorption term r in Advection Equation (6) was used as a variable, and a dehydration curve calculated by Advection Equation (6) was fitted to Equation (A) to calculate a final adsorption coefficient kc. Note that the porosity $\Phi_0$ in the adsorption term r was calculated from a volume of water required to saturate a container with a known volume and filled with the used pellet-like PVA-based resin.

<Evaluation of Filling Property>

Table 2 shows the adsorption coefficient kc obtained by fitting and the result of the pressurized dehydration test of the diverting agent used in each example.

[Table 2]

TABLE 2

| | Combination of PVA-based resins | | Pressurized dehydration test condition | Adsorption coefficient kc | Permeability test | |
|---|---|---|---|---|---|---|
| | Powder-like PVA | Pellet-like PVA | Slit width (mm) | | Permeability coefficient | Initial dehydration amount (g) |
| Example 1 | PVA1 | PVA4 | 3 | 0.038 | 6.7 | 249 |
| Example 2 | PVA1 | PVA5 | 3 | 0.043 | 7.3 | 331 |
| Example 3 | PVA2 | PVA4 | 3 | 0.045 | 6.0 | 306 |
| Example 4 | PVA3 | PVA4 | 3 | 0.023 | 19.5 | 341 |
| Example 5 | PVA1 | PVA6 | 4 | 0.071 | 3.9 | 335 |
| Example 6 | PVA1 | PVA7 | 4 | 0.071 | 3.9 | 240 |
| Comparative Example 1 | PVA1 | PVA5 | 3 | 0 | 100 | 400 |
| Comparative Example 2 | PVA1 | PVA4 | 4 | 0 | 100 | 400 |

From the results in Table 2, Comparative Examples 1 and 2, in which the adsorption coefficient kc is 0 (that is, the actual measurement result and the simulation result match), have a large permeability coefficient and a large initial dehydration amount, and an insufficient fracture filling property, in pressurized dehydration tests assuming relatively large fractures with slit widths of 3 mm and 4 mm.

On the other hand, all of Examples 1 to 6, in which the size of the pellet-like PVA-based resin (P2) was adjusted and the value of the adsorption coefficient kc was 0.01 or more, exhibited good fracture filling properties.

Although the present invention has been described in detail with reference to the specific embodiment, it will be apparent to those skilled in the art that various changes and modifications can be made without departing from the spirit and scope of the present invention. The present application is based on Japanese patent application No. 2020-177767 filed on Oct. 23, 2020, the content of which is incorporated herein as reference.

REFERENCE SIGNS LIST 1 grid

The invention claimed is:

1. A diverting agent, comprising:
a powder-like polyvinyl alcohol-based resin (P1); and
a pellet-like polyvinyl alcohol-based resin (P2), wherein the diverting agent has an adsorption coefficient kc of 0.01 or more and 1 or less, and the adsorption coefficient kc is obtained by (i) to (iii),
(i) the diverting agent is added to a 0.6 mass % aqueous solution of guar gum to prepare a mixed solution having a diverting agent concentration of 6 mass %, and the mixed solution is dispersed at 23° C. for 30 minutes to obtain a dispersion, and the dispersion is pressurized and dehydrated at a pressure of 0.4 MPa using a pressure dehydration device equipped with a slit-shaped drainage unit, and an integrated dehydration amount y with respect to a square root x of time is calculated, and a regression line represented by Equation (A) calculated by the least squares method is obtained from a scatter diagram plotted on a graph in which a horizontal axis is the square root x of time and a vertical axis is the integrated dehydration amount y, in which $$y=ax+b, \text{ and} \qquad \text{Equation (A)}$$

in Equation (A), y represents the integrated dehydration amount (grams), and x represents the square root of time (minutes) elapsed from a start of pressurization, and a and b represent a slope and an intercept of the regression line, respectively, and $0<x\leq2$, (ii) filling of the slit-shaped drainage unit in the pressure dehydration device with the diverting agent is presumed to be plugging caused by adsorption and filling of the powder-like polyvinyl alcohol-based resin (P1) into pores formed by bridging to slits of the pellet-like polyvinyl alcohol-based resin (P2), and an adsorption term r represented by Equation (5) is introduced into an advection equation used for numerical simulation of the filling, in which $$r=kc(1-\Phi_0)C, \text{ and} \qquad \text{Equation (5)}$$

in Equation (5), kc represents the adsorption coefficient, and $\Phi_0$ represents a porosity (%) of the pores formed by the pellet-like polyvinyl alcohol-based resin (P2), and C represents a concentration (mass %) of the powder-like polyvinyl alcohol-based resin (P1) in the dispersion, and (iii) the adsorption coefficient kc is obtained so that the advection equation into which the adsorption term r is introduced matches Equation (A).

2. A method for temporarily filling a fracture generated in a well, wherein the diverting agent according to claim 1 is flowed into the fracture to be filled along with a fluid flow in the well.

3. A method for forming anew fracture by pressurizing a fracturing fluid in a well while a fracture is temporarily filled by the method for temporarily filling a fracture in a well according to claim 2.

* * * * *